US006609695B2

(12) United States Patent
LaCroix et al.

(10) Patent No.: US 6,609,695 B2
(45) **Date of Patent: *Aug. 26, 2003**

(54) MOLD FOR PRODUCING MASONRY BLOCK WITH ROUGHENED SURFACE

(75) Inventors: David Matthew LaCroix, Circle Pines, MN (US); Cecil C. Schmidt, Edina, MN (US); Glenn Clarke Bolles, Edina, MN (US)

(73) Assignee: Anchor Wall Systems, Inc., Minnetonka, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/777,177

(22) Filed: Feb. 5, 2001

(65) Prior Publication Data

US 2001/0007380 A1 Jul. 12, 2001

Related U.S. Application Data

(60) Continuation of application No. 09/613,115, filed on Jul. 10, 2000, now Pat. No. 6,224,815, which is a division of application No. 09/109,555, filed on Jul. 2, 1998, now Pat. No. 6,113,379.

(51) Int. Cl.$^{7}$ ................................................ B29C 39/02

(52) U.S. Cl. ........................................ 249/130; 425/443

(58) Field of Search ................................ 425/413, 358, 425/443, 444; 249/119, 130

(56) References Cited

U.S. PATENT DOCUMENTS

| | | |
|---|---|---|
| 433,785 A | 8/1890 | Harding |
| 787,199 A | 4/1905 | Lloyd |
| 831,077 A | 9/1906 | Johnson |
| 1,219,127 A | 3/1917 | Marshall |
| 1,287,055 A | 12/1918 | Lehman |
| 1,465,608 A | 8/1923 | McCoy |
| 1,523,710 A | 1/1925 | Pfeiffer |
| 1,534,353 A | 4/1925 | Besser |
| 1,557,946 A | 10/1925 | Smith |
| 1,751,028 A | 3/1930 | Caswell et al. |
| 1,872,522 A | 8/1932 | Stuckey |
| 1,893,430 A | 1/1933 | McKenzie |
| 1,993,291 A | 3/1935 | Vermont |
| 2,011,531 A | 8/1935 | Tranchell |

(List continued on next page.)

FOREIGN PATENT DOCUMENTS

| | | |
|---|---|---|
| DE | 128672 | 11/1927 |
| EP | 0 490 534 A2 | 6/1992 |
| EP | 0 649 714 A1 | 4/1995 |
| GB | 944066 | 12/1963 |
| GB | 970595 | 9/1964 |
| GB | 2 213 095 A | 8/1989 |
| IT | 456776 | 4/1950 |
| JP | 09-001531 | 1/1997 |
| NZ | 215196 | 12/1989 |

OTHER PUBLICATIONS

"Besser Parts & Equipment", Catalog from Besser Company, Alpena, Michigan, pp. 1–22 (date unknown).
"Besser Concrete Paving Stones", Catalog from Besser company, Alpena, Michigan pp. 1–24 (date unknown).
Purchase Order for Kawano Cement Kogyo, Yamaguchi Ken, Japan, pp. 1–5 (date unknown).

*Primary Examiner*—Robert Davis
*Assistant Examiner*—Emmanuel Luk
(74) *Attorney, Agent, or Firm*—Merchant & Gould P.C.

(57) ABSTRACT

A mold box for producing a plurality of masonry units with a roughened texture side face, the mold box including a plurality of side walls defining a mold cavity open at its top and bottom, adapted to receive masonry fill material by way of its open top, and to discharge molded fill material in the form of a molded masonry unit of predetermined height by way of its open bottom; and a division member spanning between two of the side walls to define two subcavities in the mold box, the division member comprising a grate.

6 Claims, 6 Drawing Sheets

U.S. PATENT DOCUMENTS

| | | | |
|---|---|---|---|
| 2,121,450 | A | 6/1938 | Sentrop |
| 2,570,384 | A | 10/1951 | Russell |
| 3,185,432 | A | 5/1965 | Hager, Jr. |
| 3,204,316 | A | 9/1965 | Jackson |
| 3,378,885 | A | 4/1968 | Dart |
| 3,919,446 | A | 11/1975 | Smarook |
| 3,932,098 | A | 1/1976 | Huber et al. |
| 3,936,989 | A | 2/1976 | Hancock |
| 3,940,229 | A | 2/1976 | Hutton |
| 3,981,953 | A | 9/1976 | Haines |
| 4,023,767 | A | 5/1977 | Fontana |
| 4,098,865 | A | 7/1978 | Repasky |
| 4,193,718 | A | 3/1980 | Wahrendorf et al. |
| 4,207,718 | A | 6/1980 | Schaaf et al. |
| 4,218,206 | A | 8/1980 | Mullins |
| 4,238,105 | A | 12/1980 | West |
| 4,335,549 | A | 6/1982 | Dean, Jr. |
| 4,659,304 | A | 4/1987 | Day |
| 4,745,720 | A | 5/1988 | Taylor |
| 4,784,821 | A | 11/1988 | Léopold |
| 4,802,836 | A | 2/1989 | Whissell |
| 4,869,660 | A | 9/1989 | Ruckstuhl |
| 4,896,472 | A | 1/1990 | Hunt |
| 4,909,717 | A | 3/1990 | Pardo |
| 5,017,049 | A | 5/1991 | Sievert |
| 5,062,610 | A | 11/1991 | Woolford et al. |
| 5,078,940 | A | 1/1992 | Sayles |
| 5,139,721 | A | 8/1992 | Castonguay et al. |
| 5,217,630 | A | 6/1993 | Sayles |
| 5,249,950 | A | 10/1993 | Woolford |
| 5,261,806 | A | 11/1993 | Pleasant |
| 5,294,216 | A | 3/1994 | Sievert |
| 5,484,236 | A | 1/1996 | Gravier |
| 5,490,363 | A | 2/1996 | Woolford |
| 5,704,183 | A | 1/1998 | Woolford |
| 5,879,603 | A | 3/1999 | Sievert |
| 6,113,379 | A | 9/2000 | LaCroix et al. |
| 6,224,815 | B1 | 5/2001 | LaCroix et al. |

MOLD FOR PRODUCING MASONRY BLOCK WITH ROUGHENED SURFACE

"This application is a continuation of application Ser. No. 09/613,115, filed Jul. 10, 2000, now U.S. Pat. No. 6,224,815, application Ser. No. 09/613,115 is a divisional of application Ser. No. 09/109,555 filed Jul. 2, 1998, now U.S. Pat. No. 6,113,379. The complete disclosures of application Ser. Nos. 09/613,115 and 09/109,555 are incorporated herein by reference."

BACKGROUND OF THE INVENTION

The typical automated process for making a masonry unit comprises the steps of placing a mold which is open at the top and bottom on a solid pallet, filling the mold with a suitable composite material (generally comprising cement and aggregate material), vibrating the filled mold and/or the pallet while simultaneously compacting the material within the mold via a compression head inserted into the top of the mold to densify the composite material, stripping the molded composite material (still resting on the pallet) from the mold, and curing the molded composite material to form a masonry unit.

It is now also common to split off a portion of the cured masonry unit so as to create a decorative face on the unit. The splitting process creates an irregular texture, and exposes, and may actually break, some of the aggregate material in the composite. The face created by the splitting process is often referred to in the industry as "split face", or "rock face".

The splitting of cured masonry units by this process involves additional equipment and manufacturing steps. In order to avoid the added costs associated with the splitting process, there have been efforts to alter the configuration of the mold so as to achieve the same "split face" texture on the masonry unit without the additional splitting steps.

For example, U.S. Pat. No. 3,981,953 describes a mold in which a plurality of patterning elements are suspended in a frame in a horizontal array below and parallel to the compression head of the molding machine. These elements are positioned to correspond with a desired pattern of lines on the finished product. A plurality of smaller rods, arrayed at right angles to the patterning elements may also be mounted in the frame. After the mold box is filled, the compression head is lowered into the mold box, thus burying the patterning elements in the composite material. Upon stripping of the mold, retraction of the compression head pulls off the top layer of composite material, which is held between the head and the patterning elements. The result is that the pattern of the array of elements is impressed on the top of the masonry unit. Between the marks left by the patterning elements, a roughened texture is produced. This arrangement produces a pattern on the top face of the masonry unit, as molded.

There are a number of applications, however, when the face of the unit that must be textured is not the top face of the unit as molded, but, rather, is one of the vertical side faces of the unit. The '953 patent describes a modification of the process, where the frame holding the array of patterning elements is inserted vertically into the mold along and parallel to one side wall of the mold. The mold is filled and vibrated. When the molded masonry unit is stripped from the mold, it is stripped with the frame holding the array of patterning elements still embedded in the molded unit. After stripping, the frame and array of elements is pulled away from the vertical face of the molded unit in a direction normal to the face, pulling a portion of the molded unit away at the same time to expose the pattern on the vertical side of the molded unit, with roughened areas between the pattern lines. Thus it is an extremely cumbersome and impractical process to achieve a roughened texture on a vertical side of the masonry unit as cast with the process of the '953 patent. And whether the treated surface is the top or side of the masonry unit, the composite material has to be cleaned from the array of patterning elements after each cycle of the machine.

U.S. Pat. No. 3,940,229 describes a process for achieving a roughened texture on the vertical side of a masonry unit as molded. The patent describes a mold in which a small lip is formed on the inner, lower edge of a vertical wall of the mold. As the densified, composite material is stripped from this mold, the lip moves vertically up the side wall of the masonry unit, and tears some of the composite material away from the main mass. The lip temporarily retains this composite material in place against a portion of the mold wall as the mold is stripped. The retained material is thus dragged, or rolled, up the face of the main mass as the mold is stripped, creating a random, roughened texture on the vertical side face of the masonry unit. An improvement on this process is described in U.S. patent application Ser. No. 08/748,498, filed Nov. 8, 1996, which is assigned to the same assignee as the present application.

The process of the '229 patent, and the improved process of the '498 application retain a small amount of material against the mold wall as the mold is stripped. These processes create a rough textured face on a concrete masonry unit, but the texture can have a "shingled" appearance.

Another example of an alternative to splitting is shown in U.S. Pat. Nos. 5,078,940 and 5,217,630. The molds described in these patents make use of a lower lip on a vertical wall of the mold, similar to that shown in the '229 patent. In addition, the molds employ a plurality of projections on the associated vertical mold wall above the lip, and a vertically oriented reinforcing mesh above the lip and inboard from the wall. This combination of reinforcing mesh and projections is similar to the array of patterning elements and normally-oriented rods described in the '953 patent. When the mold is initially filled, the composite material fills in between the mesh and the wall, and around the projections. When the mold is vibrated, the material is compacted. The combination of lip, mesh and projections holds a large mass of compacted, composite material against the mold wall as the mold is stripped. These patents show the retained mass of composite material shearing from the rest of the composite material, to create a roughened face on the molded unit that is stripped from the mold.

In the process of the '940 and '630 patents, the use of the projections (whether or not in combination with a reinforcing mesh) holds a much larger mass of material against the mold side wall than is the case in the '229 process, and does so in such a fashion as to retain that material in the mold from cycle to cycle. This creates what is perceived to be a potential drawback of the process of the '940 and '630 patents: it is not self cleaning, and it can be difficult and/or time consuming to clear the retained material from the mold side wall, which apparently need not be done on every machine cycle, but must be done periodically. On the plus side, this process can create a face which does not evidence as much "shingling" as with the '229 process.

Accordingly, there is a need for a self-cleaning mold assembly which will produce a random, roughened texture face that does not evidence any "shingling" on a vertical side face of a masonry unit without a splitting step, so that the manufacturing process can operate without periodic cleaning or maintenance for extended production runs.

SUMMARY OF THE INVENTION

The invention is a self-cleaning mold assembly which will produce a random, roughened texture face that does not evidence any "shingling" on a vertical side face of a masonry unit without a splitting step, so that the manufacturing process can operate without periodic cleaning or maintenance for extended production runs.

The mold comprises a standard masonry mold assembly including a mold box which is open at the top and bottom, and a complementary compression head/stripper shoe plate. The cavity defined by the mold box is divided into at least two subcavities by a vertically-oriented division member comprising a grate. The compression head is shaped so that it can move into, and through, each subcavity of the mold during the compaction and stripping operations. In operation, a metal pallet is placed under the mold. The mold cavity is filled via its open top, with the composite material filling in each mold subcavity. The composite material is densified in the mold by vibration of the mold, the pallet, or both. The compression head further compacts the composite, and then moves through the mold subcavities as the pallet is moved downwardly away from the mold, to strip all of the compacted material out of the mold. The stroke of the machine thus produces at least two molded masonry units. The faces of the resulting units which were adjacent the grate in the mold have a random, roughened texture, without shingling, that approximates the "split face" achieved by splitting cured masonry units. Since the compression head moves down through the mold adjacent each side of the grate, the mold is self-cleaning, and can be used in extended production runs without stopping for periodic cleaning or maintenance.

DETAILED DESCRIPTION OF THE PREFERRED EMBODIMENT

Figure 1:
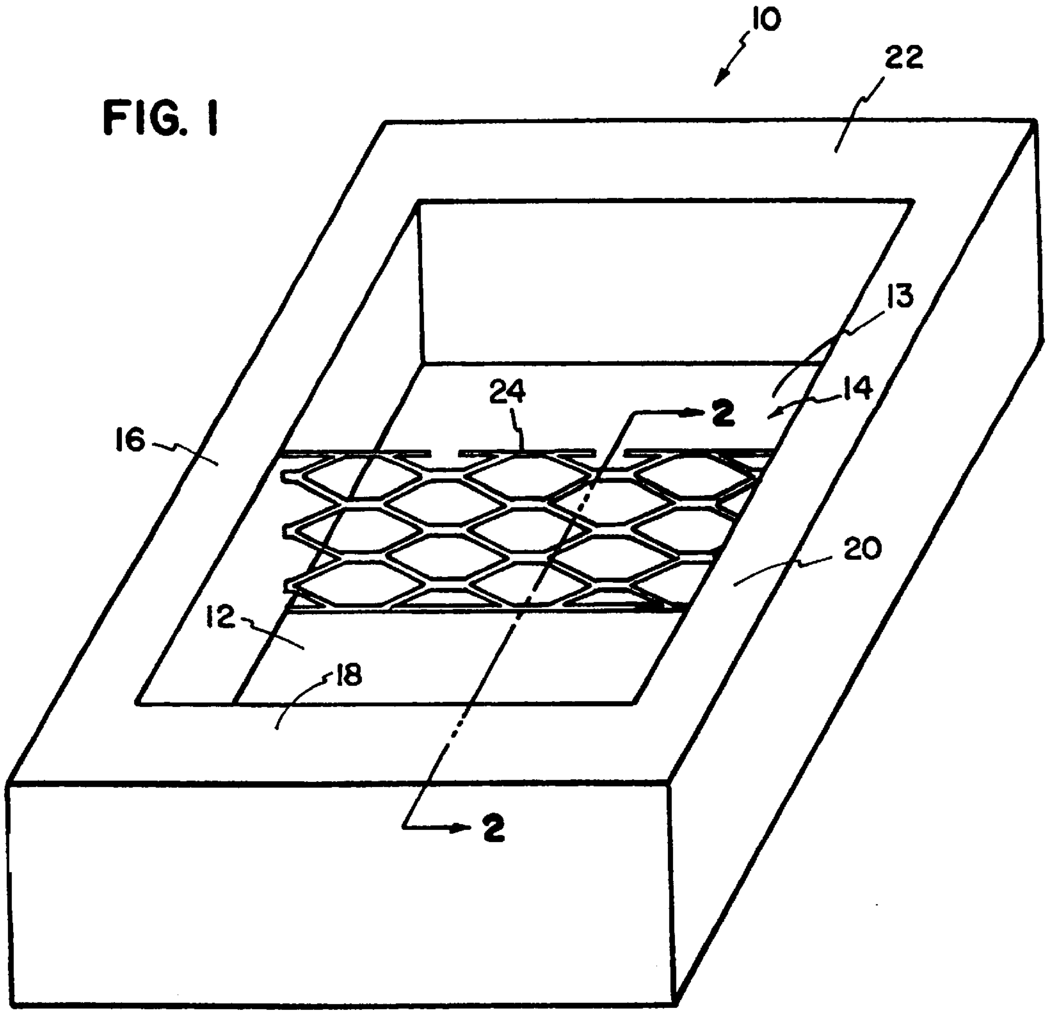
FIG. 1 is a perspective view of a mold box in accordance with the invention.
Figure 2:
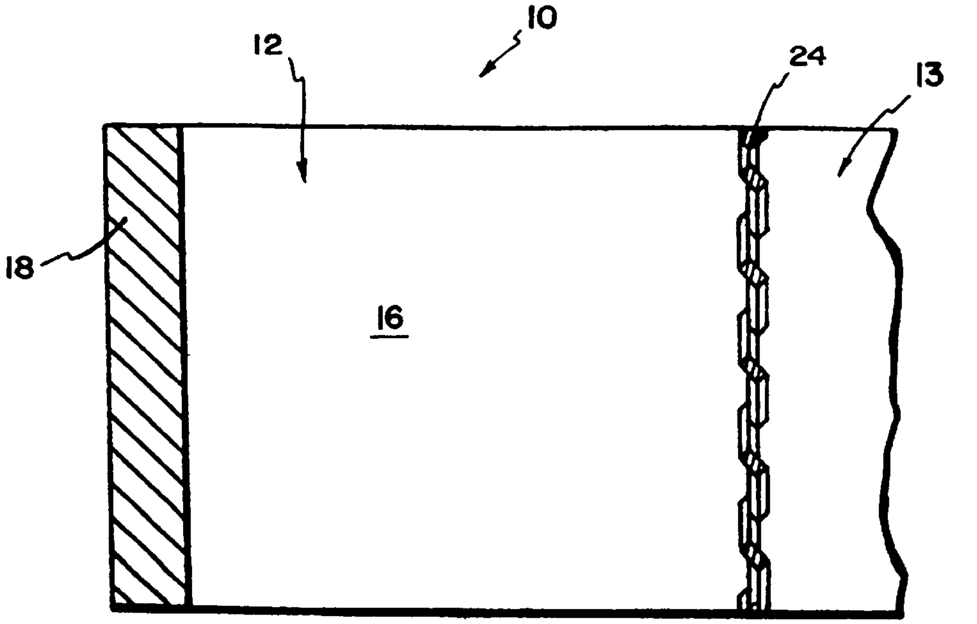
FIG. 2 is a sectional view of the mold box shown in FIG. 1 taken at line 2—2.

The invention is a self-cleaning mold for producing a plurality of masonry units or blocks, each with a roughened texture side surface, without the use of apparatus such as splitters. The invention may be used with different types of molds to produce different types of blocks, such as decorative architectural blocks, paving stones, landscaping blocks, retaining wall blocks, etc. An example of the mold 10 is schematically shown in FIG. 1. The mold comprises a mold box made up of side walls 16, 18, 20 and 22, and is open at its top and bottom. The mold is adapted to rest on a pallet 60 (FIG. 3), to receive composite material. The mold box comprises subcavities 12 and 13, separated by division member 14. Division member 14 comprises a grate 24 defined by solid portions and open portions. In the preferred mold box, the grate 24 is vertically oriented and spans from side wall to side wall and from top to bottom of the mold box.

A molded masonry unit will be produced by each subcavity of the mold, and the preferred grate 24 configuration will produce a roughened texture on the entire face of each molded unit that contacts the grate 24. If, however, it is not desirable to texture that entire face, the grate 24 can be located in only a portion of the division member 14 defining the subcavities, such as on one end, or in the central portion of that division member 14. The side walls of the mold will typically be made up of a series of wear parts, which are not shown in FIG. 1, but which are well known to those of skill in the art. Also not shown are the side bars, spill plate, and other associated parts that are common in this type of mold, and which are also well known to those of skill in the art.

Figure 6:
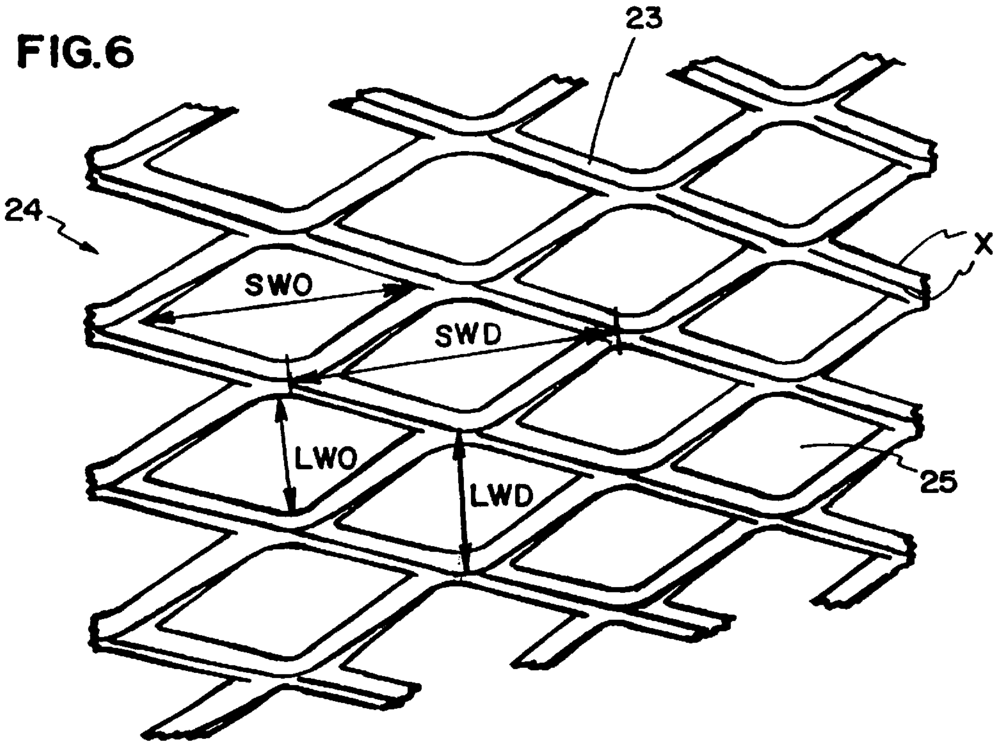
FIG. 6 is an enlarged view of the raised expanded metal grating used in preferred form of the invention.

The preferred configuration of the material from which the grate is constructed is shown in more detail in FIG. 6. The preferred grate comprises a panel of raised expanded metal grating. It is believed that the process for making the grate 24 comprises slitting and stretching solid sheets or plates of metal. The preferred grate 24 comprises a plurality of strands 23 configured in a diamond pattern with openings 25. The strands 23 are somewhat twisted and offset as a result of the expanded metal manufacturing process. Referring to FIG. 6, the dimensions (in inches) of the preferred grate are:

| | |
|---|---|
| Diamond Size (SWD × LWD) | 1.41 × 4.00 |
| Opening Size (SWO × LWO) | 1.00 × 2.88 |
| Strand Size (width × thickness) | .300 × .250 |
| Depth | ⅝ |
| Percent Open Area | 58 |
| Lbs. per square foot | 4.27 |

Expanded metal grating is commercially available from EXMET Industries Inc. in the size described, and in a variety of other dimensions, as well. The SWD of expanded metal grating available from EXMET varies from about 1.33 to 2.00 inches. The LWD varies from about 4.00 to 6.00 inches. The SWO varies from about 0.813 to 1.625 inches. The LWO varies (from about 3.4 to 4.88 inches. The strand 23 width varies from about 0.215 to 0.410 inches. The strand 23 thickness varies from about 0.183 to 0.312 inches. The depth varies from about 9/16 to about ¾ inches. The percent open area varies from about 45 to 69%. The weight per square foot varies from about 3 to 7 pounds. All of these standard expanded metal gratings could be used in the present invention. It is also believed that expanded metal panels in lighter and heavier gauges and in different patterns than those used for grating can also be used, so long as in the material is sufficiently durable for the presented environment. It is also possible to combine two expanded metal panels back to back to create the grate. It is also possible to combine an expanded metal panel with a solid panel, so that the roughened texture will be produced on only one face of a molded unit in one subcavity of the mold box.

The material of the preferred grate is carbon steel, but a variety of materials could be used, so long as they produce a durable grate suitable for the presented environment.

It is also believed that the grate could be formed by a variety of processes other than that used to produce expanded metal, such as by punching or drilling openings in a metal sheet, cutting openings in a metal sheet with a torch, twisting or welding individual strands together, etc.

The grate must be mounted in a manner that provides durability in the presented environment, as well. In the presently preferred embodiment, the grate 24 is simply welded to the side walls of the mold box. It could, however, be affixed to support elements (33 and 35, FIG. 8) which, in turn, are affixed to the side walls of the mold box by welding, bolting, or other suitable means.

Figure 3:
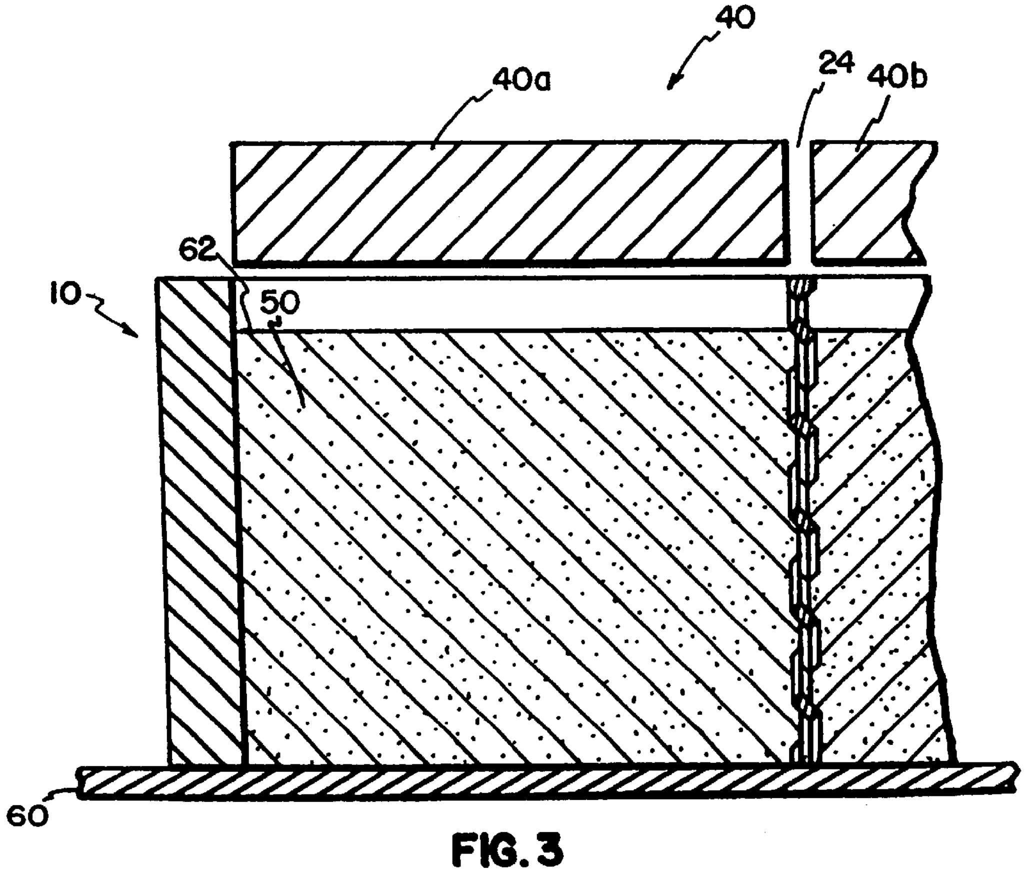
FIG. 3 is a view similar to that shown in FIG. 2 additionally showing the mold box filled with composite material and a sectional view of the stripper shoe plate.
Figure 4:
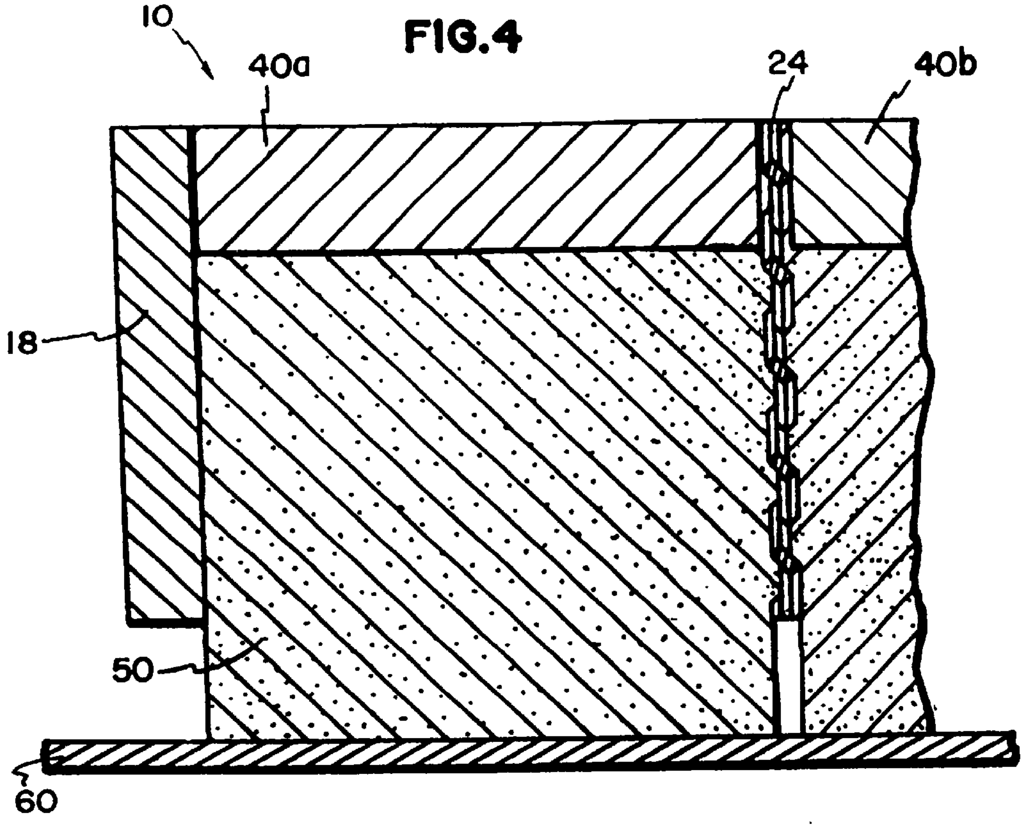
FIG. 4 is a view similar to that shown in FIG. 3 showing the action of the stripper shoe plate as the densified composite material is stripped from the mold.

The mold box works in conjunction with a stripper shoe head. As shown in FIGS. 3 and 4, the stripper shoe head 40 comprises stripper shoe plates (40*a* and 40*b*), each of which is associated wit a subcavity of the mold box 10. Each stripper shoe plate conforms in shape and size with the top plan shape and size of the subcavity with which it is associated. The stripper shoe plates are preferably sized so as to provide about 1/16 inch of clearance with the mold side walls and the grate 24. This clearance allows the plates 40*a* and 40*b* to move downwardly through the mold box 10 as the mold is stripped, but does not permit composite material to move upward past the plate edges during stripping (which would create "feathered" edges on the molded product.

To use the invention, a pallet 60 is moved into place beneath the mold 10, as shown in FIG. 3. The pallet 60 may be made of wood, plastic, or metal. The mold is then loaded with composite masonry fill 50 through its open top to a predetermined initial fill level 62. Composite masonry fill generally is composed of aggregate material, cement, and water. It may include other ingredients, such as pigments, plasticizers, and other filler materials, depending upon the particular application.

The mold 10, or pallet 60, or a combination of both, may be vibrated for a suitable period of time to assist in the loading of the mold 10. The stripper shoe plates 40*a* and 40*b* are then moved into the mold box 10 to bear on the fill 50. Additional vibration, in concert with pressure exerted through the plates acts to densify the composite fill to the desired density and to achieve the predetermined, final height of the molded unit. Once this is achieved, relative movement of the stripper shoe plates 40*a* and 40*b* and the pallet 60 with respect to the mold box 10 strips the molded unit from the mold box (FIG. 4). The mold filling time, the vibration times and the amount of pressure exerted by the plates are determined by the particular machine used, and the particular application. For a Besser V3 12 block machine, typical settings for this application would be: 1¾ seconds feed time, with vibration on; a ⅛ inch spring gap setting to establish the pressure exerted by the plates; and a 2 second finish time with plate pressure and vibration exerted on the fill mass.

Figure 5A:
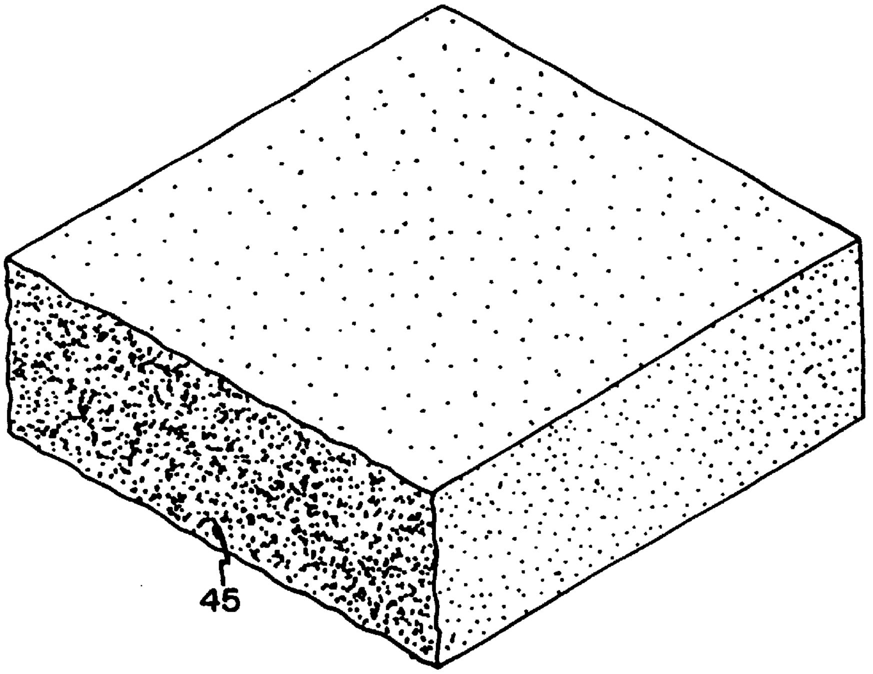
FIG. 5A is a perspective view of a block made with the process of the invention using the mold depicted in FIG. 1.
Figure 5B:
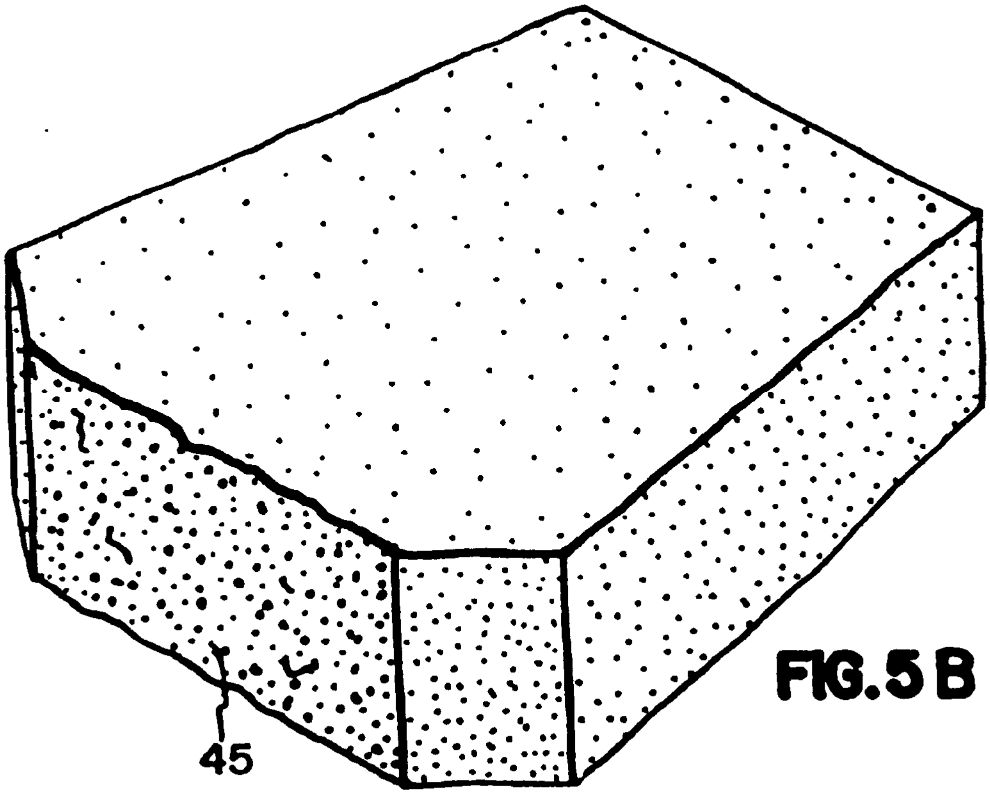
FIG. 5B is a perspective view of an alternative embodiment of a block made in accordance with the process of the invention.

The action of stripping the block from the mold 10 creates a roughened texture on those surfaces 45 of the fill mass that pass and contact the grate 24 (see FIGS. 5A and 5B). Thus, with the mold shown, two molded units, each having a roughened face 45, are produced with each cycle of the machine. These units are subsequently transported to a suitable curing station, where they are cured with suitable techniques known to those of skill in the art. Curing mechanisms such as simple air curing, autoclaving, steam curing or mist curing are all useful methods of curing the block resulting from the invention.

It is preferred that each subcavity of the mold be of substantially the same shape and size, so that all of the molded units are substantially identical. It is possible, however to create subcavities that are not substantially identical, thereby producing molded units of different shapes or sizes with each cycle of the machine. It is also possible that not all of the molded units produced will be passed to the curing station. For example, one of the molded units may be reclaimed, and recycled as fill material, rather than cured.

Figure 7:
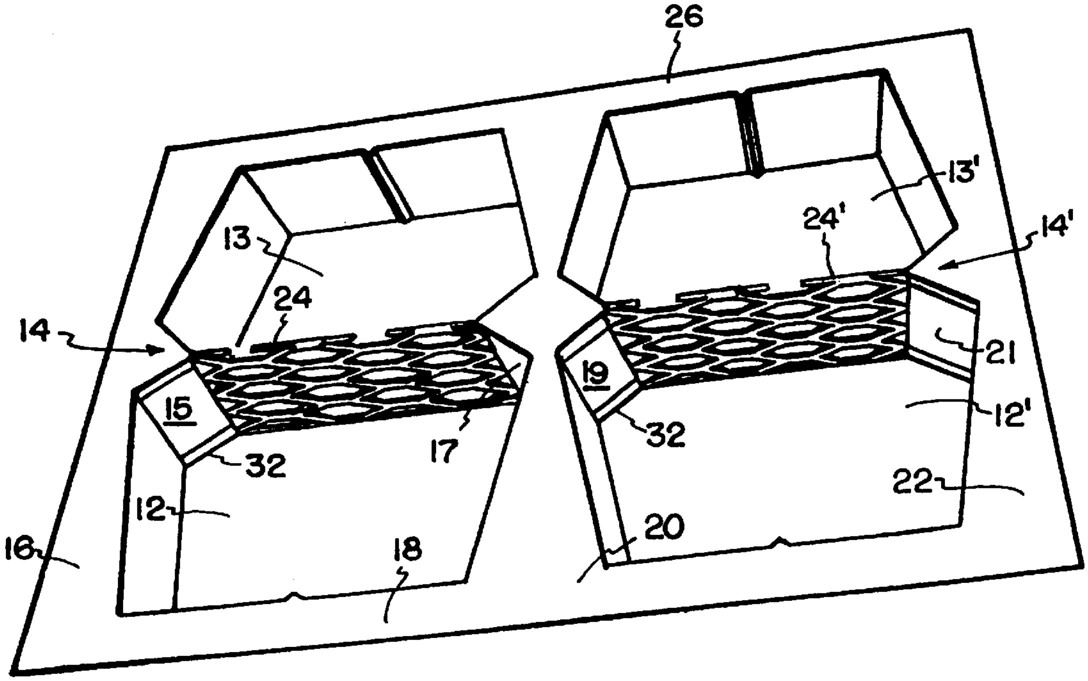
FIG. 7 is a perspective view of a mold in accordance the invention adapted to make locks of a different shape.

Blocks of shapes other than rectangular may be made with the present invention. For example, the mold shown in FIG. 7 may be used to produce a block of a different shape. The mold box 10 comprises side walls 16, 18, 20, 22, and 26, and includes subcavities 12 and 13 separated by division member 14, and subcavities 12' and 13', separated by division member 14'. The division members comprise a grate 24 and 24'.

The mold side walls include wedge walls 15, 17, 19, and 21 to form features on the molded units. Lower lips 32 are formed on each of these wedge walls. Preferably, the lower lips extend from the wedge walls 15 and 17 into the cavity approximately 0.187 inches. The shape of lower lips 32 in cross section is preferably a wedge. The presently preferred dimensions of the lip are a thickness of about ¼ inch adjacent walls 15 and 17, and a thickness of about 1/16 inch at is outboard end. The presently preferred profile of the lower lip is that it be a straight outboard edge long its entire length. However, other shapes, such as a serrated edge or a scalloped edge, can be used to produce different roughened textures on the face of the finished masonry unit.

Figure 8:
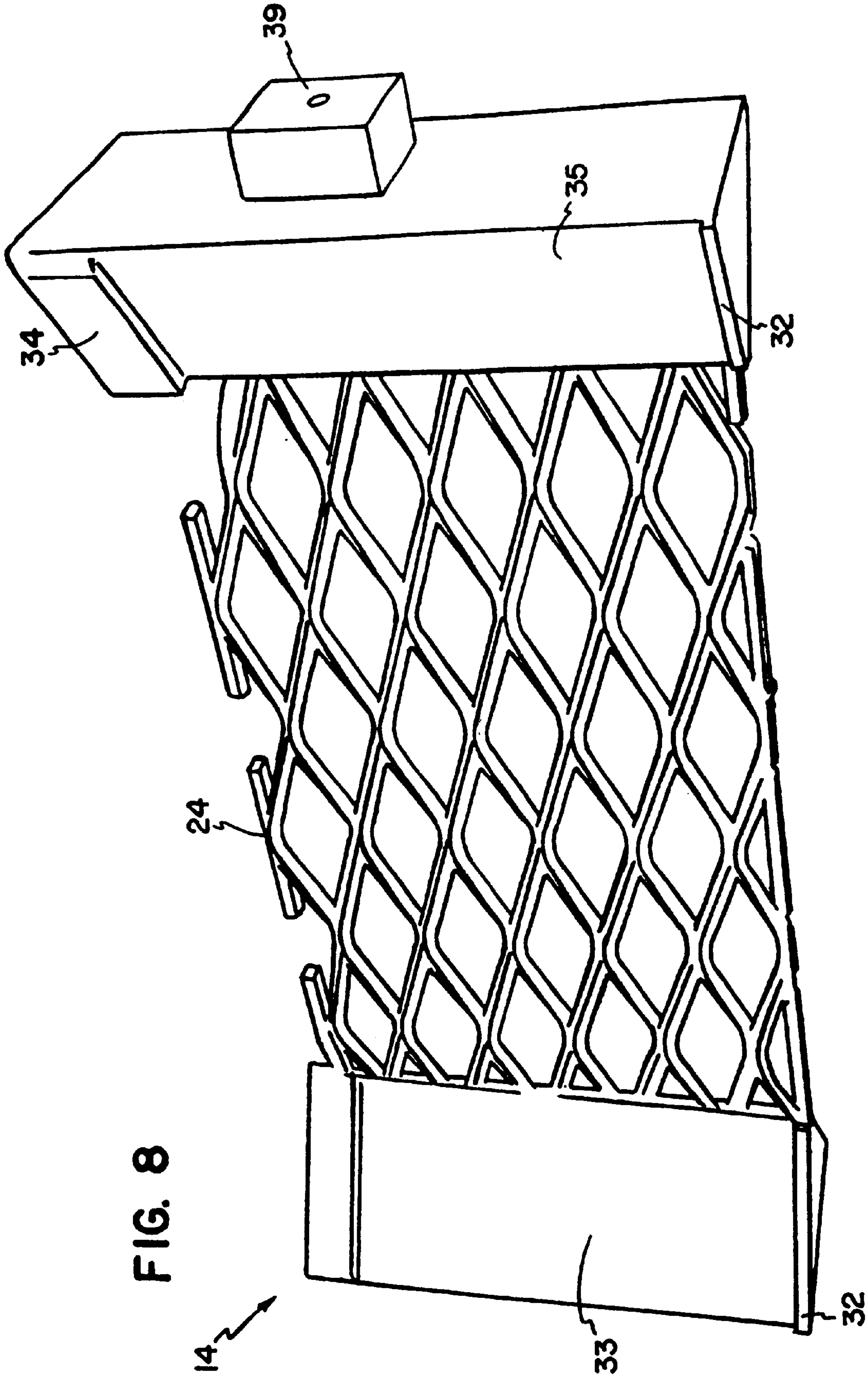
FIG. 8 is a perspective view of a division member for the mold shown in FIG. 7.

The lower lips 32 may be releasably attached to the side wall by means such as bolts, screws, etc. which allows for their removal. This is important because the lower lips 32 are wear points in the mold apparatus and may after time tear, chip or break. Alternatively, the lower lip 32 may be welded to the wedge walls, or formed integrally therewith. The wedge walls 33 and 35 and grate panel 24 can be incorporated into a division member 14, as shown in FIG. 8. In this case, the grate 24 is welded to the wedge pieces, which, in turn are adapted to be bolted 39 into the mold box side walls. Upper lips 34 assist in forming the roughened surfaces of molded units made in accordance with the invention. These upper lips can be seen in U.S. patent application Ser. No. 08/748,498 filed Nov. 8, 1996 which is incorporated herein by reference.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. A mold for producing at least two molded concrete units from a single mold cavity while simultaneously creating a roughened textured surface on at least one of the sides of each of said concrete units, the mold comprising:

a plurality of generally vertical side walls defining a single mold cavity which is open at its top and bottom; and a grate located within and bridging at least a portion of the mold cavity, the grate being oriented generally vertically within the mold cavity and dividing the mold cavity into at least two mold sub-cavities each of which has a size sufficient to form a molded concrete unit, the grate including a plurality of strands configured in a diamond pattern with openings permitting communication between the at least two sub-cavities, and wherein the grate is fixed in relation to the side walls of the mold cavity so tat the grate is retained within the mold cavity when the molded concrete units are stripped from the mold cavity.

2. The mold of claim 1, wherein the grate is fixed at each end thereof to a side wall of the mold cavity.

3. The mold of claim 1, wherein the grate is fixed at each end thereof to a support element that is, in turn, fixed to a side wall of the mold cavity.

4. The mold of claim 1, wherein the grate extends from the top of the mold cavity to the bottom of the mold cavity.

5. The mold of claim 1, wherein the area of the top opening of one of the mold sub-cavities is substantially equal to the area of the bottom opening of said mold sub-cavity.

6. The mold of claim 1, wherein the area of the top opening of each of the mold sub-cavities is substantially equal to the area of the bottom opening of the mold sub-cavities.

* * * * *